United States Patent
Ivanov et al.

(10) Patent No.: US 10,175,336 B2
(45) Date of Patent: Jan. 8, 2019

(54) SUPPORTING RADIO MODEL QUALITY ASSURANCE

(71) Applicant: HERE GLOBAL B.V., Eindhoven (NL)

(72) Inventors: Pavel Ivanov, Tampere (FI); Lauri Wirola, Tampere (FI); Jari Syrjärinne, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/531,287

(22) PCT Filed: Dec. 4, 2014

(86) PCT No.: PCT/EP2014/076519
§ 371 (c)(1),
(2) Date: May 26, 2017

(87) PCT Pub. No.: WO2016/086993
PCT Pub. Date: Jun. 9, 2016

(65) Prior Publication Data
US 2017/0343639 A1 Nov. 30, 2017

(51) Int. Cl.
*G01S 5/02* (2010.01)
*H04W 4/04* (2009.01)
(Continued)

(52) U.S. Cl.
CPC ............. *G01S 5/0252* (2013.01); *H04W 4/04* (2013.01); *H04W 4/80* (2018.02); *H04W 84/12* (2013.01)

(58) Field of Classification Search
CPC ....... G01S 5/0252; H04W 4/04; H04W 4/008; H04W 84/12
(Continued)

(56) References Cited

U.S. PATENT DOCUMENTS

| 8,385,943 B1 | 2/2013 | Han et al. |
| 8,504,288 B2 | 8/2013 | Kadous et al. |

(Continued)

FOREIGN PATENT DOCUMENTS

| EP | 1 227 694 A1 | 7/2002 |
| WO | WO 2012/032376 A1 | 3/2012 |

(Continued)

OTHER PUBLICATIONS

International Search Report and Written Opinion for Application No. PCT/EP2014/076519, dated Sep. 3, 2015, 10 pages.
(Continued)

*Primary Examiner* — Huy C Ho
(74) *Attorney, Agent, or Firm* — Alston & Bird LLP

(57) ABSTRACT

An apparatus obtains fingerprints that have been collected by at least one mobile device for supporting a positioning of other mobile devices. Each fingerprint comprising results of measurements on radio signals of at least one communication node at a particular location and an indication of the particular location. The apparatus estimates values of parameters defining a radio model for the at least one communication node based on the obtained fingerprints. The apparatus determines a quality of the radio model. The apparatus generates data for a feedback for a user of the at least one mobile device based on the determined quality of the radio model.

22 Claims, 6 Drawing Sheets

(51) Int. Cl.
*H04W 24/00* (2009.01)
*H04W 72/00* (2009.01)
*H04B 17/02* (2006.01)
*H04W 4/80* (2018.01)
*H04W 84/12* (2009.01)

(58) Field of Classification Search
USPC .......................................... 455/456.6, 115.1
See application file for complete search history.

(56) References Cited

U.S. PATENT DOCUMENTS

| | | | |
|---|---|---|---|
| 8,548,497 | B2 | 10/2013 | Lymberopoulos et al. |
| 8,594,680 | B2 | 11/2013 | Ledlie et al. |
| 2006/0089153 | A1 | 4/2006 | Sheynblat |
| 2011/0039580 | A1 | 2/2011 | Wigren et al. |
| 2011/0176523 | A1 | 7/2011 | Huang et al. |
| 2011/0306365 | A1 | 12/2011 | Wirola et al. |
| 2012/0139790 | A1 | 6/2012 | Wirola et al. |
| 2012/0184219 | A1 | 7/2012 | Richardson et al. |
| 2012/0225663 | A1* | 9/2012 | Gupta .................. G01S 5/0063 455/456.1 |
| 2013/0035109 | A1 | 2/2013 | Tsruya et al. |
| 2013/0072216 | A1 | 3/2013 | Ledlie |
| 2013/0162481 | A1 | 6/2013 | Parvizi et al. |
| 2013/0210449 | A1 | 8/2013 | Flanagan |
| 2013/0281111 | A1 | 10/2013 | Syrjarinne et al. |
| 2013/0288704 | A1 | 10/2013 | Wirola et al. |
| 2014/0106773 | A1 | 4/2014 | Li |
| 2014/0171098 | A1 | 6/2014 | Marti et al. |
| 2014/0171118 | A1 | 6/2014 | Marti et al. |
| 2014/0194139 | A1 | 7/2014 | Yang et al. |
| 2014/0213298 | A1 | 7/2014 | Marti et al. |
| 2015/0341895 | A1* | 11/2015 | Zhang .................... G01S 5/021 455/456.1 |
| 2016/0161592 | A1 | 6/2016 | Wirola et al. |

FOREIGN PATENT DOCUMENTS

| | | |
|---|---|---|
| WO | WO 2012/139250 A1 | 10/2012 |
| WO | WO 2013/065042 A1 | 5/2013 |
| WO | WO 2013/070170 A1 | 5/2013 |
| WO | WO 2013/128059 A1 | 9/2013 |
| WO | WO 2014/026338 A1 | 2/2014 |
| WO | WO 2014/065735 A1 | 5/2014 |
| WO | WO 2015/198091 A1 | 12/2015 |

OTHER PUBLICATIONS

International Preliminary Report on Patentability for Appilcation No. PCT/EP2014/076520, dated Jun. 15, 2017, 9 pages.
International Search Report and Written Opinion for Application No. PCT/EP2014/0776752, dated Jul. 27, 2015, 11 pages.
International Search Report and Written Opinion for Application No. PCT/EP2014/078952 dated Jul. 23, 2015, 10 pages.
Cisco Mobile Services Engine—Context Aware Mobility Solution Deployment Guide [online] [retrieved Dec. 19, 2014]. Retrieved via the Internet: <http://www.cisco/com/c/en/us/support/docs/wireless/mobility-services . . . > (dated Jul. 16, 2009) 52 pages.
Farid, Z. et al., *Recent Advances in Wireless Indoor Localization Techniques and System*, Journal of Computer Networks and Communications, vol. 2013, Art ID 185138 (dated 2013), 12 pages.
Nurminen, H. et al., *Statistical Path Loss Parameter Estimation and Positioning Using RSS Measurements in Indoor Wireless Networks*, 2012 IEEE, International Conference on Indoor Positioning and Indoor Navigation (Nov. 2012) 9 pages.
Tsui, A. W. et al., *Accuracy Performance Analysis Between War Driving and War Walking in Metropolitan WiFi Localization*, IEEE Transactions on Mobile Computing, vol. 9, Issue 11 (Jul. 1, 2010) 13 pages.
Wu, C. et al., *DorFin: WiFi Fingerprint-Based Localization Revisited*, [online] Retrieved from the Internet: http://arxiv.org/pdf/1308.6663.pdf. (dated Aug. 30, 2013) 10 pages.
Notice of Allowance received for U.S. Appl. No. 15/532,717 dated Jul. 16, 2018.
Office Action for U.S. Appl. No. 15/532,717 dated Jan. 26, 2018, 16 pages.

* cited by examiner

SUPPORTING RADIO MODEL QUALITY ASSURANCE

FIELD OF THE DISCLOSURE

The invention relates to the field of positioning and more specifically to supporting radio model quality assurance.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to the invention comprises, performed by at least one apparatus, obtaining fingerprints that have been collected by at least one mobile device for supporting a positioning of other mobile devices, each fingerprint comprising results of measurements on radio signals of at least one communication node at a particular location and an indication of the particular location. The method further comprises estimating values of parameters defining a radio model for the at least one communication node based on the obtained fingerprints. The method further comprises determining a quality of the radio model. The method further comprises generating data for a feedback for a user of the at least one mobile device based on the determined quality of the radio model.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting radio model quality assurance. In certain embodiment, any of the presented first apparatuses is an apparatus for supporting radio model quality assurance.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
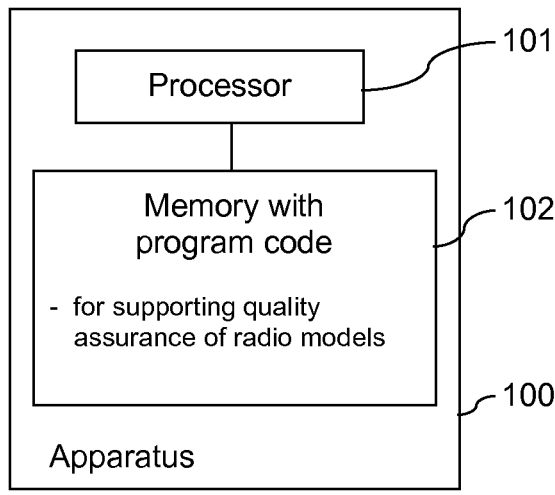
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for supporting radio model quality assurance. Processor 101 is configured to execute computer program code stored in memory 102 in order to cause an apparatus to perform desired actions.

Apparatus 100 could be a stationary device, like a dedicated quality assurance server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains fingerprints that have been collected by at least one mobile device for supporting a positioning of other mobile devices. Each fingerprint comprises results of measurements on radio signals of at least one communication node at a particular location and an indication of the particular location. (action 201)

The apparatus furthermore estimates values of parameters defining a radio model for the at least one communication node based on the obtained fingerprints. (action 202) While the parameters may be understood to define a general radio model, specific values of the parameters are to be understood to define a specific radio model for a specific communication node. A general radio model as well as a specific radio model may be for instance in the form of an equation or a set of equations including the parameters or the values of the parameters, respectively.

The apparatus furthermore determines a quality of the radio model. (action 203)

The apparatus furthermore generates data for a feedback for a user of the at least one mobile device based on the determined quality of the radio model. (action 204) The apparatus may cause the feedback to be presented to the user by the mobile device, or cause the data for the feedback to be transmitted to the mobile device for presentation to the user.

The quality of an indoor positioning which is based on collected fingerprints may depend on the coverage and density of the collected fingerprints. Collecting fingerprints via crowd-sourcing may result in a large number of fingerprints; however, this may mean for some areas that more fingerprints have to be processed than needed, while other areas that are rarely visited may not be represented at all. Therefore, collecting agents may be recruited to survey particular localization sites in a systematic manner, in order to increase the coverage at these sites. Such localization sites may comprise for instance a building or some other venue that is important for a company or an association of companies. Still, even if a collecting agent moves through a site in a systematic manner, it is not possible to tell whether sufficient fingerprints are being collected at all locations of the site. For instance, more fingerprints may be needed from areas with walls than from open areas, etc.

Certain embodiments of the invention allow determining the quality of radio models that can be generated based on fingerprints collected by a device or a group of devices, and providing a feedback to a user of the device on the basis of the determined quality. The radio models mentioned in this document are defined by the values of a finite number of parameters; thus they and can be understood to be or to be based on parametric radio models.

Certain embodiments of the invention may have the effect that a user of a mobile device who surveys a site for collecting fingerprints in a systematic manner receives a feedback on his work. This may ensure on the one hand that the user does not spend more time than needed for collecting fingerprints at a particular site, if the fingerprints that have been collected so far already enable a generation of radio models for the site with satisfactory quality. This may be of value, since data collection is a laborious process and after a certain point, an increasing density and number of collected fingerprints is not suited to further improve the positioning accuracy. Thus, costs for the collection of more data than needed as well as processing resources for processing more data than needed may be reduced. On the other hand, the feedback may ensure that the user does not stop the collection of fingerprints at a particular site, if the fingerprints that have been collected so far do not yet result in radio models of satisfactory quality. This may be of value, since the need for a supplementary survey of the site may be avoided. This may save costs for the new survey and also avoid negative user experience of other users, who are trying to determine their position based on the collected data, in the meantime. Radio models for communication nodes may enable a positioning of mobile devices which are configured to perform measurements on radio signals transmitted by the communication nodes. Using the quality of radio models as a basis for the feedback may be particularly useful, if the positioning of other mobile devices is to be based on such radio models or a derivation of such radio models. In this case, the quality of radio models may provide a good indication of the quality of a positioning that can be achieved based on the fingerprints that have been collected so far.

Figure 2:
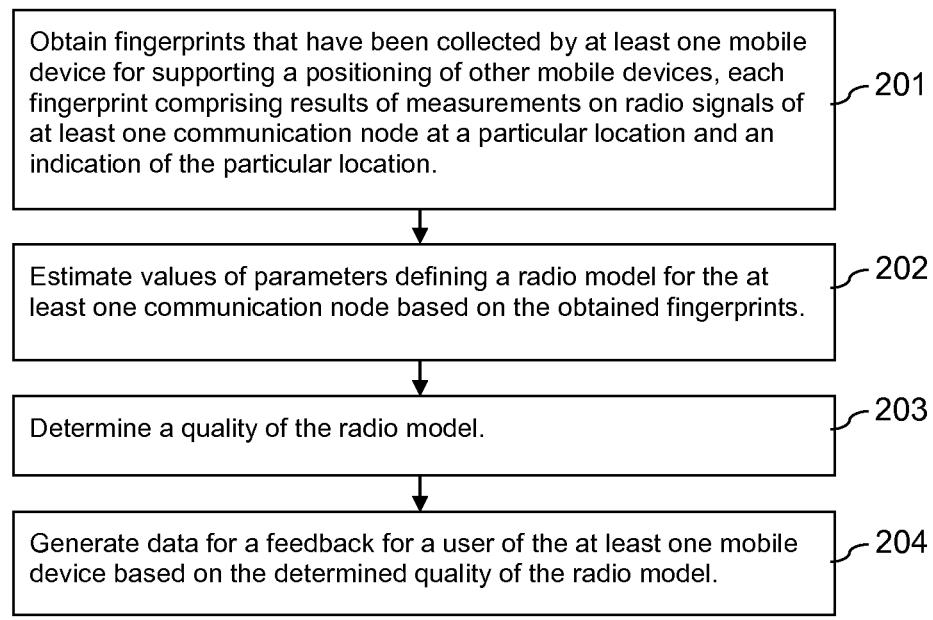
FIG. 2 is a flow chart illustrating an example embodiment of a method.

Apparatus 100 illustrated in FIG. 1 and the method illustrated in FIG. 2 may be implemented and refined in various ways.

The location in a collected fingerprint may have only a horizontal component, for instance a longitude value and a latitude value, or easting and northing values. Alternatively, it could also have an altitude component. Considering an altitude value may be of particular interest for indoor positioning. In outdoor positioning it is often enough to achieve horizontal position estimates using a two-dimensional map, whereas indoors, especially in tall buildings, it may be of interest to have a capability to estimate the floor on which a person is located as well. Including an altitude component in the fingerprints may allow determining the floor of a building in which a mobile device and thus a person using the device is located. The altitude value can indicate for example an absolute altitude, a relative altitude compared to the altitude of the ground floor of a building or a floor number. The altitude component for a fingerprint may be determined in a different manner than the horizontal location, for instance using a calibrated barometer, an uncalibrated barometer or an input of a user indicating the floor on which fingerprints are to be collected.

In an example embodiment, determining a quality of the radio model comprises determining an uncertainty of the estimated value of at least one of the parameters and determining a quality of the radio model based on the determined uncertainty of the value of the at least one parameter. This may have the effect that the quality of a radio model may be checked based on the radio model as such. As a result, a feedback may be provided to a user collecting fingerprints basically in real time and thus be available while a user is still at the collection site so that the user may complete the collection of fingerprints, if necessary, right away.

The parameter values of a radio model could be estimated for instance using an iterative least squares method for solving non-linear problems, like the Gauss-Newton method. The computations for minimizing a function using this method include a computation of an approximation of a covariance matrix, which indicates the uncertainty of each parameter value. Thus, estimating parameters values of a radio model and determining the uncertainty of the parameter values defining the radio model may be a single action in certain embodiments.

In an example embodiment, determining an uncertainty of a value of at least one of the parameters defining the radio model comprises determining an uncertainty of values of a plurality of the parameters, and wherein the quality of the radio model is determined to be high, if the uncertainty of each of the values of the plurality of the parameters lies below a predetermined threshold for the respective parameter. This may have the effect that the quality is easy to determine and significant. It is to be understood that the uncertainty could be evaluated in other manners too for determining the quality of the radio model. For example, if the values of two of the parameters have a very low uncertainty, falling short of a respective low first threshold, the value of the third parameter might have a medium uncertainty, lying between a respective first and second threshold, and the quality of the radio model could still be considered to be satisfactory.

In an example embodiment, the parameters may comprise a location of the communication node. The parameters may comprise a transmission power used by the communication node. Alternatively, the parameters may comprise a received signal strength at a predetermined reference distance to the communication node. Such a reference signal strength is also referred to as apparent transmission power. Relying on an apparent transmission power as a parameter rather than the actual transmission power may have the effect that it is easier to determine in a reliable manner based on measured values. The parameters may comprise a path loss exponent for signals transmitted by the communication node or an average path loss of signals transmitted by the communication node. Values for a combination of a communication node location, some transmission power related parameter and some path loss related parameter may be suited to comprehensively define a radio model.

An example embodiment of the presented method further comprises determining a quality of a set of a plurality of radio models for a particular site for which values of parameters have been estimated. The quality of the set may correspond to a proportion of radio models for the particular site with high quality to a total number of communication nodes for which results of measurements are included in the obtained fingerprints for the particular site. This may have the effect that it allows an easy estimation whether the overall quality for a particular site is already satisfactory or not. A high overall quality of radio models at a particular site may result in a satisfactory quality of a positioning which makes use of the available data, even if the quality of one of the radio models may be low or if there is a communication node for which the generation of a radio model is not possible in the first place. If the overall quality is satisfactory, further efforts for collecting fingerprint data may thus not be required. In an alternative approach, it would also be possible to determine the quality of the set to correspond to a proportion of radio models with high quality to a total number of the plurality of radio models for the particular site. In this case, it has to be taken into account, though, that it may not be possible to generate a model for some communication nodes, for example if the number of results of measurements for the node is extremely low. A hypothetical model for this communication node can be considered to be a model of low quality. In a further alternative approach, it would also be possible to determine the quality of the set to correspond to a ratio of the number of radio models with high quality to the size of the total area of a localization site.

An example embodiment of the presented method further comprises generating an indication that no further fingerprints have to be collected in case the determined quality of the set of radio models exceeds a predetermined threshold. Such an indication may be presented to the user. This may have the effect that a user collecting fingerprints may stop surveying a particular site when the quality obtained so far is satisfactory.

In an example embodiment, generating data for a feedback for a user of the at least one mobile device based on the determined quality of the radio model comprises generating an indication of the quality of the radio model for presentation to the user.

In an example embodiment, generating data for a feedback for a user of the at least one mobile device based on the determined quality of the radio model comprises generating an indication of the quality of the radio model and an indication of an estimated location of an associated communication node for presentation to the user. The indication of the quality could be an indication of a particular aspect of the quality. For instance, it could be an indication of an area that is defined such that it may be assumed that the estimated location lies within the area with a certain probability.

In an example embodiment, generating data for a feedback for a user of the at least one mobile device based on the determined quality of the radio model comprises generating an indication of the quality of the radio model and an indication of an area covered by the radio model for presentation to the user. It is to be noted that any area indicated to be covered by the radio model in this document does not necessarily have to comprise the entire area in which signals transmitted by the communication node may be expected to be observed. It may be for instance an estimated coverage area or a part of such an area that is determined based on the estimated radio model parameters; for instance it may be an area in which it may be expected that signals of the communication node can be received with at least a minimum signal strength. Or it may be for instance an area or a part of an area comprising all locations at which results of measurements have been obtained for the communication node; for instance it may be an area in which a certain percentage of the measurements for a communication node have bee obtained.

In an example embodiment, generating data for a feedback for a user of the at least one mobile device based on the determined quality of the radio model comprises generating an indication of an area covered by the radio model, in which area further fingerprints should be collected, for presentation to the user, in case the quality of the radio model has been determined to be low according to at least one predetermined criterion.

In an example embodiment, generating data for a feedback for a user of the at least one mobile device based on the determined quality of the radio model comprises generating an indication of an area covered by the radio model, in which area further fingerprints should be collected, for presentation to the user, in case the quality of the radio model has been determined to be low according to at least one predetermined criterion and in case a number of fingerprints collected in the area falling short of a predetermined number of fingerprints has been obtained. The number can be for example an absolute number of fingerprints that have been obtained for the communication node, or a relative number, like a density of fingerprints that have been obtained for the communication node.

In an example embodiment, generating data for a feedback for a user of the at least one mobile device based on the determined quality of the radio model comprises generating an indication of areas for which a number of fingerprints below a predetermined number of fingerprints has been collected, for presentation to the user. Such areas may thus be areas not covered or not covered sufficiently by the fingerprints that have been collected so far. Again, the considered number can be an absolute number of fingerprints or a relative number of fingerprints. The user may thereby be caused to collect fingerprints with the aim to have the localization area covered completely, though sparsely, for instance every 10 square meters or any other distance, by fingerprints. Thus, the data that is generated for a feedback for a user does not have to be based exclusively on the determined quality of radio models; there can also be additional data that is generated taking account of additional criteria.

In an example embodiment, generating data for a feedback for a user of the at least one mobile device based on the determined quality of the radio model comprises generating an indication of areas in which additional fingerprints should be collected for presentation to the user.

In an example embodiment, generating data for a feedback for a user of the at least one mobile device based on the determined quality of the radio model comprises generating an indication of a quality of a set of radio models for a plurality of communication nodes, for which values of parameters have been estimated, for presentation to the user.

In an example embodiment, generating data for a feedback for a user of the at least one mobile device based on the determined quality of the radio model comprises generating an indication of a quality of a set of radio models for a plurality of communication nodes, for which values of parameters have been estimated, for presentation to the user, the quality of the set of radio models being based on a determined quality of each of the radio models.

In an example embodiment of the presented method, the actions are performed in an iterative process. The apparatus estimates values of parameters of a radio model for the at least one communication node based on a growing number of obtained fingerprints until a predetermined criterion is met. In such an iterative process, the feedback may cause the user to collect more fingerprints until the predetermined criterion is met. This may have the effect that the improvement of the fingerprint collection can be monitored by the user. The predetermined criterion can be of various kinds. It could relate for instance the number of iterations and/or to a quality of all radio models at a particular site, and/or to an overall quality of a set of all radio models.

Radio model qualities may be determined for example upon a respective request of the user, for example at a point of time when the user has completed a first survey of a site or a first survey of a floor of a site or a first survey of a section of a site. The determination may be performed only once in this case, or—for an iterative process—the user may request a new determination after some further fingerprints have been collected and added to the set of fingerprints, until the user is satisfied with the result.

In an alternative example embodiment, radio model qualities are determined automatically on a regular basis during a collection of fingerprints by the at least one mobile device at a particular site. The regular basis may be defined in terms of time or in terms of the number of fingerprints that have been collected after the preceding determination of the radio model qualities. This may have the effect of reducing the number of tasks that have to be performed by the user. In some embodiments, the regular basis may be defined such that a continuous or basically continuous determination of the radio model qualities is performed based on a constantly growing set of fingerprints. Using a basically continuous determination of the qualities may have the effect that the user may be informed continuously about the progress in collecting fingerprints so that he may optimize his surveying route in the localization area. Such a basically continuous determination could also be started after a first survey of a site has been completed, in order to save processing resources.

Any data for the feedback that is generated for a user can be presented to the user in different ways. It can be presented as pure text information, as text information that is included in a map, and/or as a map with markings. It could also comprise some audible feedback.

An example embodiment of the presented method further comprises presenting, based on the generated data for the feedback, a map of a site at which fingerprints are being collected on a display of the mobile device, the map including a marking of each area in which further fingerprints should be collected. This may have the effect that a user can be guided for further collection of fingerprints. The marking may be selected such that it can be grasped by the user at a glance.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well. The communication nodes do not even have to be ground-based necessarily. For example, the communication nodes could also comprise communication nodes in a ship.

In an example embodiment, the apparatus determining the radio model quality is or belongs to the mobile device which collects the fingerprints. This may have the effect that the mobile device may operate independently of a server with respect to the collection of fingerprints. This means that the mobile device does not necessarily have to have communication capabilities for communicating with a server via the air interface, or that it does not have to rely on a connectivity to a server—for example via a cellular communication network—at any location at which information on the positioning quality may be desired. In an alternative example embodiment, the apparatus determining the radio model quality is or belongs to a server that is configured to receive and process sets of fingerprints from a plurality of mobile devices. This may have the effect that processing resources of the mobile device are saved. This may further have the effect that a positioning quality for a site may be determined in common based on a set of fingerprints that have been collected by several mobile devices at the same site.

Figure 3:
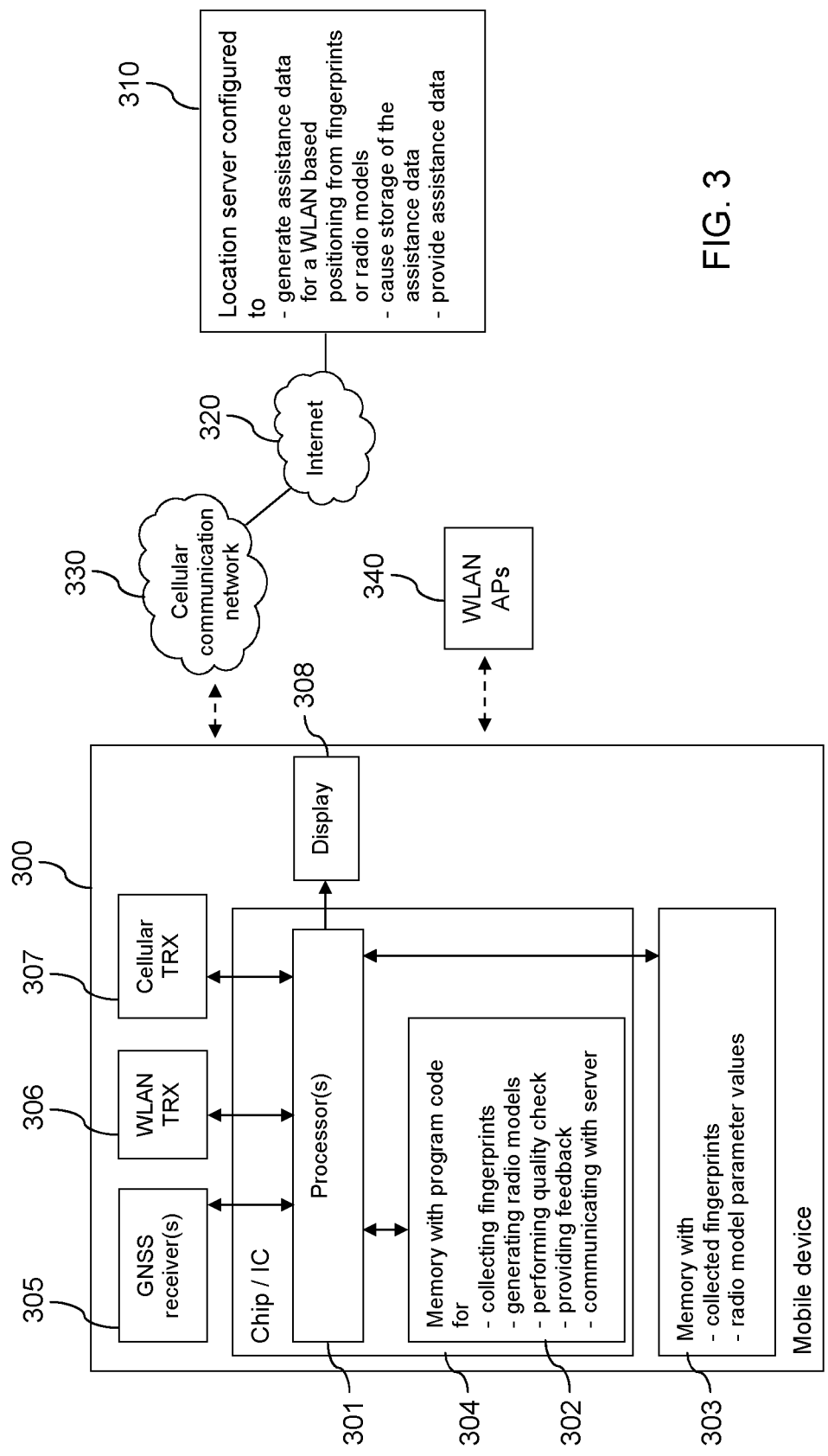
FIG. 3 is a schematic block diagram of a first example embodiment of a system.

FIG. 3 is a schematic block diagram of a first example embodiment of a system according to the invention. The system may support radio model quality assurance at a mobile device that is used for surveying.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a regular smartphone or a dedicated surveying device. Mobile device 300 comprises a processor 301 that is linked to a first memory 302, to a second memory 303, to at least one GNSS receiver 305, to a WLAN component 306, to a cellular communication component 307 and to a display 308.

Processor 301 is configured to execute computer program code, including computer program code stored in memory 302, in order to cause mobile device 300 to perform desired actions.

Memory 302 stores computer program code for collecting fingerprints, computer program code for generating radio models, computer program code for performing a quality check on the radio models, computer program code for providing a feedback to a user of mobile device 300 and computer program code for communicating with server 310. Some of the program code in memory 302 may be similar to the program code in memory 102. In addition, memory 302 could store computer program code configured to realize other functions. In addition, memory 302 could also store other kind of data.

Processor 301 and memory 302 may optionally belong to a chip or an integrated circuit 304, which may comprise in addition various other components, for instance a further processor or memory.

Memory 303 is configured to store data, including for example data of collected fingerprints and parameter values defining radio models. It could be configured to store any other desired data as well.

The at least one GNSS receiver 305 could comprise any kind of global navigation satellite signal receiver for example a GPS receiver and/or a GLONASS receiver and/or a GALILEO receiver. It may be configured to receive corresponding satellite signals and to determine the current position of mobile device 300 based on the signals, possibly using assistance data. WLAN component 306 includes at least a WLAN transceiver (TRX). WLAN component 306 enables mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330. It could be a cellular engine that is configured to take care of all processing required for a cellular communication. Alternatively, at least some of the processing that is required for a cellular communication may be realized by processor 301 executing corresponding additional program code stored in memory 302.

Display 308 could be a touchscreen or a display that is not touch sensitive.

It is to be understood that mobile device 300 could comprise various other components, like user input means and speakers.

Component 304 or mobile device 300 could be an example embodiment of an apparatus according to the invention.

Location server 310 is a server that is configured to receive fingerprints and/or radio model data from various mobile devices via the Internet 320, to generate assistance data for a WLAN based positioning based on the received data, to cause storage of the assistance data and to provide the assistance data to mobile terminals or other entities upon request. It could also be configured to carry out positioning computations upon request based on provided radio measurements. Server 310 could comprise a memory for storing the assistance data or it could be configured to access an external memory storing the assistance data, optionally via another server.

Cellular communication network 330 could be any kind of cellular communication network, like a Global System for Mobile Communications (GSM), a CDMA2000, a Universal Mobile Telecommunications System (UMTS), or a long term evolution (LTE) based communication network.

The WLAN access points (AP) 340 could be access points of one or more WLANs. The WLAN or WLANs may but do not have to be connected to the Internet 320.

Figure 4:
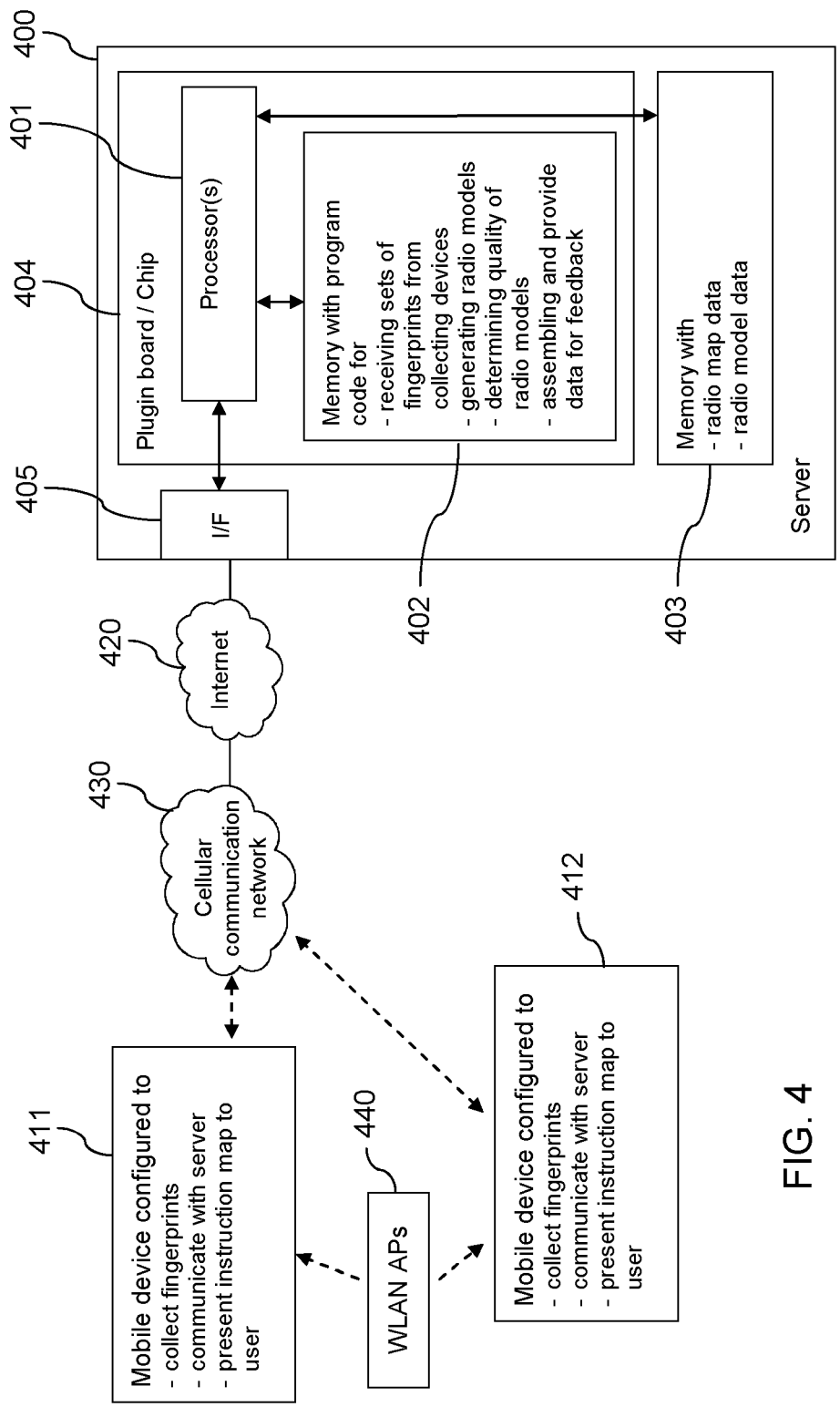
FIG. 4 is a schematic block diagram of a second example embodiment of a system.

FIG. 4 is a schematic block diagram of a second example embodiment of a system according to the invention. In this case, the system may support radio model quality assurance at a server.

The system comprises a server 400 and a plurality of mobile devices 411, 412. The system further comprises a network 420, by way of example the Internet. The system further comprises a cellular communication network 430 that is connected to the Internet 420. The system further comprises a number of WLAN access points (AP) 440.

Server 400 may be for instance a server that is provided specifically for checking the quality of radio models that can be generated based on collected fingerprints, or it could be a server which receives fingerprints for generating and updating data for a large positioning database, or it could be any other server. Server 400 comprises a processor 401 that is linked to a first memory 402, to a second memory 403 and to an interface (I/F) 405.

Processor 401 is configured to execute computer program code, including computer program code stored in memory 402, in order to cause server 400 to perform desired actions.

Memory 402 stores computer program code for receiving sets of fingerprints from collecting devices, computer program code for generation radio models, computer program code for performing a quality check on radio models, and computer program code for assembling and providing data for a feedback for presentation to users of the collecting devices. Some of the program code may be similar to the program code stored in memory 102. In addition, memory 402 could store computer program code configured to realize other functions, for instance program code for generating positioning assistance data, for providing assistance data to mobile devices upon request and/or for performing positioning computations for mobile devices upon request. In addition, memory 402 could also store other kind of data.

Processor 401 and memory 402 may optionally belong to a plug-in board or a chip with an integrated circuit 404, which may comprise in addition various other components, for instance a further processor or memory.

Memory 403 is configured to store data, including for example data of received sets of fingerprints and parameter values of radio models. In addition, it could store other data, including for example assistance data for a WLAN based positioning.

It is to be understood that the data of memory 403 could also be distributed to several memories, which may be partly or completely external to server 400. For example, fingerprints and parameter values of radio models that are stored for performing a quality check could be stored internal to server 400 and computed final assistance data could be stored at an external memory that is accessible via another server.

Interface 405 is a component which enables server 400 to communicate with other devices, like mobile device 411 and 412, via networks 420 and 430. It could also enable server 400 to communicate with other entities, like other servers. Interface 405 could comprise for instance a TCP/IP socket.

It is to be understood that server 400 could comprise various other components.

Component 404 or server 400 could be an example embodiment of an apparatus according to the invention.

Mobile devices 411, 412 may be for instance mobile terminals, like regular smartphones or dedicated surveying devices. They are configured to collect fingerprints, to communicate with server 400 and to present information to a user. Mobile devices 411, 412 may be similar to mobile device 300 of FIG. 3, except that they do not have to have program code for generating and evaluating radio models stored in memory 302.

Cellular communication network 430 could be again any kind of cellular communication network.

The WLAN access points (AP) 440 could be again access points of one or more WLANs. The WLAN or WLANs may but do not have to be connected to the Internet 420.

While the systems of FIG. 3 and FIG. 4 are different in that the system of FIG. 3 enables a mobile device 300 to perform a quality check and the system of FIG. 4 enables a server 400 to perform a quality check, the actual operations that are carried out for the quality check may be similar.

Example operations in the system of FIG. 3 will now be described with reference to FIG. 5.

Processor 301 and some of the program code stored in memory 302 may cause mobile device 300 of FIG. 3 to perform the presented actions when the program code is retrieved from memory 302 and executed by processor 301.

A surveying person may be requested to collect fingerprints on a particular localization area, for instance on all floors of a particular building. The surveying person may activate an application comprising the program code for collecting fingerprints in memory 304 for automatically collecting fingerprints while he is moving through the area. As a result, GNSS receiver 305 and WLAN component 306 may be activated. GNSS receiver 305 captures satellite signals and estimates the position of mobile device 300 at regular intervals, for example once per second. Since the satellite signals may be difficult to receive in the building, the positioning could be assisted by assistance data that is provided by some GNSS assistance server via cellular communication network 330 and received at mobile device 300 via cellular communication component 307. WLAN component 306 detects radio signals from WLAN access points 340 in the environment and perform radio measurements at the same regular intervals. The results of the measurements may contain for example a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.). Fingerprints are assembled to comprise a location that has been determined at a particular time and results of measurements for one or more WLAN access points 340 that have been obtained basically at the same time. (action 501) Alternatively to using a satellite signal based positioning for obtaining information on the measurement locations, the surveying person could be required to enter information on a respective measurement location, for instance based on a map that guides him through the building.

The surveying person may move slowly through the localization area guided by a grid overlaying a map of the localization area with the target to pass through each of the grid areas of the grid, as far as lying inside of the localization area, at least once. In the case of a GNSS based positioning, an indication of the respective position of the surveying person could be indicated on the map as well as further guidance. Alternatively, the surveying person could try to uniformly pass through all parts of the area on his own. The collected fingerprints may be stored in memory 303.

Mobile device 300 obtains a set of fingerprints from memory 303. (action 511) A set of fingerprints may be obtained upon indication of the surveying person that a first survey of the localization area has been completed, or it could be obtained on a regular basis or even continuously during the ongoing survey. In the latter cases, a set of fingerprints may always include all fingerprints that have been collected so far.

Mobile device 300 maps the results of measurements in the fingerprints to grid points of one or more grids. (action 512) A grid could be defined for each floor of the surveyed localization area. Each grid could be a uniformly spaced rectangular two-dimensional grid representing a geographical area that includes the area of one of the floors of the localization area. Each grid could have for instance grid step of 10 meters in each direction. The measurement results in each of the fingerprints could then be mapped to a grid point of the grids that is provided for one of the floors. Each grid point could represent a particular geographic location of the surveyed localization area and possibly of some surrounding area. The correct floor and thus the correct grid could be determined based on an altitude component in the location that is indicated in the respective fingerprint and on knowledge about the floor height in a building Instead of using a separate two-dimensional grid for each floor, it would also be possible to use a cuboid three-dimensional grid for an entire multi-level building. The grid point to which the measurement results of a particular fingerprint are mapped could be the grid point that corresponds to a real location that is closest to the horizontal location indicated in the fingerprint. If the measurement results for the same WLAN access point from several fingerprints would be mapped to the same grid point, an average value of the received signal strength (RSS) could be used, for example. The result can be considered to be a radio map, which indicates for various locations corresponding to a grid point an expected RSS value for one or more WLAN access points. An indication of the number of considered fingerprints could be associated with each grid point.

This action of mapping measurements to grid points of a grid is optional. It may reduce for instance the processing effort for the following action.

Mobile device 300 now generates a radio model for each WLAN access point for which RSS values are available in the grid data by estimating the values of parameters defining the radio mode. Mobile device 300 also determines the uncertainties of the estimated parameter values. (action 513) The radio model may be any kind of model that is defined by values of a limited set of parameters and that enables an estimation of a position based on available RSS measurements on matching WLAN access points. By way of example, it is assumed that the radio model is a path loss model, which is defined by an estimation of the location of the WLAN access point, an estimation of an apparent transmission power used by the WLAN access point for transmitting signals and an estimated path loss exponent. The parameter values for each radio model could be estimated for example using a standard radio signal propagation model and the Gauss-Newton algorithm for a non-linear fitting problem.

An example approach for the estimation of parameter values of a radio model based on measurement results has been described by H. Nurminen, J. Talvitie, S. Ali-Löytty, P. Müller, E.-S. Lohan, R. Piché and M. Renfors in "Statistical Path Loss Parameter Estimation and Positioning Using RSS Measurements in Indoor Wireless Networks", 2012 IEEE, International Conference on Indoor Positioning and Indoor Navigation, 13-15th November 2012. WLAN access point position, apparent transmission power and path loss exponent are estimated in this approach using an iterative reweighted least squares method (Gauss-Newton method). The considered apparent transmission power is the received signal power at a distance of 1 meter to the WLAN AP position. An initial value for the AP position may be set to the location at which the highest RSS value has been measured according to the mapped RSS values. The Bayesian Gauss-Newton algorithm presented in this document also returns an approximation for the covariance matrix of each quantity. Thus, the estimation of the parameter values of each radio model already comprises an estimation of uncertainties of the parameter values.

In the following, an example computation using a Gauss-Newton algorithm for estimating radio model parameter values will be presented. The algorithm is bases on a given set of RSS measurements with respective locations in the three-dimensional (3D) space and priors of node location, apparent transmission power and average path loss exponent. It is to be understood that other models could be used just the same, including for instance more complicated models, e.g. path loss models taking floor losses into account.

Assuming for a communication node the general path loss model $PL(x, A, n, m) = A - 10n \cdot \log_{10}(\|x - m\|)$, where A is an apparent transmission power at a distance of 1 meter to the communication node, where n is an average path loss exponent and where m is the location of the communication node, having set of measurements $(x_i; RSS_i)$, $i = 1, \ldots, M$, where $$x_i = \begin{bmatrix} x_i^1 \\ x_i^2 \\ x_i^3 \end{bmatrix}$$

is the location of the $i^{th}$ measurement (in 3D metric space) and $RSS_i$ is the received signal strength (in dBm) of the $i^{th}$ measurement, R being a measured RSS covariance matrix, and assuming priors for A, n, m with means $$A_0, n_0, m_0 = \begin{bmatrix} m_0^1 \\ m_0^2 \\ m_0^3 \end{bmatrix}$$

and covariance matrices $\Sigma_{A,n}$ and $\Sigma_m$ respectively, the values of the model parameters for the communication node can be estimated by means of a Gauss-Newton algorithm as follows:

1. Set:
   a. step length $\alpha$, e.g. $\alpha=0.05$;
   b. maximum number of algorithm iterations $k_{max}$, e.g. $k_{max}=1000$;
   c. stopping tolerance $\delta$, e.g. $\delta=0.01$;
   d. initial vector of parameters $z_0=[A_0, n_0, m_0^T]^T$ and parameters covariance $$\sum\nolimits_0 = \begin{bmatrix} \sum_{A,n} & 0 \\ 0 & \sum_m \end{bmatrix};$$

e. iteration index k=0
2. Compute the Jacobian matrix:

$$J_k = \begin{bmatrix} 1 & -10\log_{10}(\|x_1 - z_k^{3:5}\|) & -\frac{10z_k^2(x_1^1 - z_k^3)}{\ln(10)\|x_1 - z_k^{3:5}\|^2} & -\frac{10z_k^2(x_1^2 - z_k^4)}{\ln(10)\|x_1 - z_k^{3:5}\|^2} & -\frac{10z_k^2(x_1^3 - z_k^5)}{\ln(10)\|x_1 - z_k^{3:5}\|^2} \\ \vdots & \vdots & \vdots & \vdots & \vdots \\ 1 & -10\log_{10}(\|x_M - z_k^{3:5}\|) & -\frac{10z_k^2(x_M^1 - z_k^3)}{\ln(10)\|x_M - z_k^{3:5}\|^2} & -\frac{10z_k^2(x_M^2 - z_k^4)}{\ln(10)\|x_M - z_k^{3:5}\|^2} & -\frac{10z_k^2(x_M^3 - z_k^5)}{\ln(10)\|x_M - z_k^{3:5}\|^2} \end{bmatrix}.$$

3. Compute the vector of residuals:

$$r_k = \begin{bmatrix} z_k^1 - 10z_k^2\log_{10}(\|x_1 - z_k^{3:5}\|) - RSS_1 \\ \vdots \\ z_k^1 - 10z_k^2\log_{10}(\|x_M - z_k^{3:5}\|) - RSS_M \end{bmatrix}.$$

4. Compute $$\Delta z_k = -(\Sigma_0^{-1} + J_k^T R^{-1} J_k)^{-1} \cdot (\Sigma_0^{-1}(z_k - z_0) + J_k^T R^{-1} r_k)$$

5. Compute $$z_{k+1} = z_k + \alpha \Delta z_k$$

6. If $\|\Delta z_k\| > \delta$ and $k \le k_{max}$ increment k and repeat from step 2; otherwise stop and calculate a final covariance matrix for the parameter values $$\Sigma = (\Sigma_0^{-1} + J_k^T R J_k)$$

Now, the location of the communication node can be estimated as $\hat{m}=z_{k+1}^{3:5}$ with covariance matrix $\Sigma_{3:5,3:5}$, the apparent transmission power of the communication node can be estimated as $\hat{A}=z_{k+1}^1$ with covariance matrix $\Sigma_{1,1}$, and the average path loss exponent of the communication node can be estimated as $\hat{n}=z_{k+1}^2$, with covariance matrix $\Sigma_{2,2}$.

Prior values for the apparent transmission power and the average path loss exponent can be chosen according to a usual power of WLAN access points and an average path loss exponent in indoor environments, e.g. $A_0=-30$, $n_0=3$, and a corresponding covariance matrix can be set to e.g.

$$\sum\nolimits_{A,n} = \begin{bmatrix} 100 & 0 \\ 0 & 4 \end{bmatrix}.$$

Prior location of the communication node can be chosen as the location of the strongest RSS measurement, and the location covariance matrix can be chosen as e.g.

$$\sum\nolimits_m = \begin{bmatrix} 2500 & & \\ & 2500 & \\ & & 36 \end{bmatrix}.$$

The measured RSS covariance matrix can be set e.g. to $R=25 \cdot I_{M \times M}$, where $I$ is an identity matrix.

Alternatively, it would also be possible to generate two-dimensional radio models for each WLAN access point on a per floor basis.

Mobile device 300 may now estimate the quality of each radio model based on the estimated uncertainties of the estimated parameters values. (action 514) The quality of a radio model may be determined to be either high or low. The quality of a radio model may be determined to be high, if the uncertainty for each parameter value—that is, the uncertainty of the estimated location of the access point, the uncertainty of the estimated apparent transmission power and the uncertainty of the estimated path loss exponent— falls short of a threshold predetermined for the respective parameter. If the uncertainty for at least one of the parameter values exceeds the threshold defined for the parameter, in contrast, the quality of a radio model may be determined to be low. It is to be understood that alternatively, more than two quality levels could be defined.

Next, mobile device 300 may determine the general quality of the set of radio models that has been determined for a currently surveyed localization area. (action 515) If the quality of the set of radio models in general is high, it may be acceptable if the quality of some individual radio model or models is low. The general quality of the set of radio models may be estimated by determining the proportion of the number of radio models that have been determined to have a high quality to the total number of access points that have been detected at a particular localization site.

If the proportion reaches or exceeds a predetermined threshold, for example 75%, this may indicate that the general quality of the set of radio models that are based on data that has been collected so far is sufficiently high. If the proportion falls short of the predetermined threshold, for example 75%, this may indicate that additional data may have to be collected for obtaining an acceptable general quality of the set of radio models. It is to be understood that any other threshold could be selected just the same.

At least in case the general quality of the set of radio models is low, mobile device 300 determines a respective area in which additional fingerprints should be collected for those access points for which the quality of the generated radio model has been determined to be low in action 514. (action 516) Such an area could be the Elliptical Error Probable 68 ($EEP_{68}$) of the estimated location; that is, an ellipse that contains the estimated location with the probability 0.68. It is to be understood that any other probability value could be selected as well. It is further to be understood that such an area could also be selected differently. It could be for instance a circular area or an area limited by an ellipse, either having its center at the estimated location of the access point and including the measurement location of a certain percentage of all measurements on signals transmitted by the access point. Thus, if reference is made to a $EEP_{68}$ area in the following, variations are meant as well. In addition, mobile device 300 could take account of the density of fingerprints in these $EEP_{68}$ areas. The density can be determined based on the number of fingerprints that have been mapped to the grid points of the grid lying in a $EEP_{68}$ area in relation to the number of grid points in this area or in relation to the size of this area or in relation to the number of grid areas covered either totally or partially by the $EEP_{68}$ area.

Optionally, corresponding $EEP_{68}$ areas could be determined for those access points for which the quality of the generated radio model has been determined to be high in action 514. In this case, the determined $EEP_{68}$ areas could be distinguished for example by an associated qualifier for access points with high quality radio model and access points with low quality radio model.

In addition, mobile device 300 may evaluate areas based on the indication of the number of mapped fingerprints that have been associated in action 512 with each grid point of the grid, that is, independently from the generated radio models. Areas surrounding a grid point with an indication of a number of mapped fingerprints falling short of a predetermined threshold may be considered to require collection of additional fingerprints. (action 517) The area surrounding the grid point could be selected in various ways. For example, it could be all grid areas, for which the grid point forms one of the corner points. This would result in overlapping areas for the grid points. Each grid area could be defined to require further collection of data, if it has at least one corner that is defined by a grid point with a number of mapped fingerprints falling short of a predetermined value.

Alternatively, the area surrounding a grid point could a square having the same size as the grid areas, but having the grid point as its center.

The results from actions 515 to 517 may now be combined for generating data for a map that can be presented to a user for indicating to the user in which areas additional fingerprints have to be collected. (action 518) For example, all areas in which additional fingerprints should be collected may be qualified such that they are eventually presented in red, and all areas from which no additional fingerprints are required may be qualified such that they are eventually presented in green.

If the general quality of the set of radio models has been determined to be low in action 515, data for a map can be assembled that indicates all $EEP_{68}$ areas determined in action 516 for radio models with low quality and with a total number of fingerprints falling short of a predetermined threshold in red. If the quality of a radio model is low, but the density of fingerprints that has been collected for the access point is already high, it may be assumed that collecting further fingerprints for this access point may not result in a significant improvement of the quality of the radio model either. The $EEP_{68}$ areas can be defined to be presented as circles or ellipses, as circular areas or elliptical areas, or as the grid areas totally included by the $EEP_{68}$ areas, or by all grid areas overlapping at least partly with the $EEP_{68}$ areas. If the $EEP_{68}$ areas are to be presented as red circles or ellipses, optionally the assembled data for a map may show all $EEP_{68}$ areas determined in action 516 for radio models with high quality and possibly all $EEP_{68}$ areas determined in action 516 for radio models with low quality and high fingerprint density as green circles or ellipses in addition.

If the general quality of the set of radio models has been determined to be low in action 515, the assembled data for a map shows in addition all areas determined in action 517 to require further measurements in red.

If the general quality of the set of radio models has been determined to be low in action 515, the assembled data for a map may optionally show all remaining areas in green.

In certain exemplary embodiments, it would thus be possible to present the results of action 516 with red and/or green ellipses and the results of action 517 as red and/or green background areas. In other exemplary embodiments, also the results of action 516 could be presented by fully colored areas; in case different colors are assigned to an area based on the results of actions 516 and 517 in this embodiment, red may always be the color of choice. The reason is that it is possible that there is a high number of fingerprints inside an ellipse, but they all are clustered within one small section of the ellipse. In this case the total and relative (to the area covered by the ellipse) amount of fingerprints inside an ellipse might be high. Therefore, it may be of use to collect additional fingerprints in other parts of the area covered by the ellipse.

If the general quality of the set of radio models has been determined to be high in action 515, there may simply be a notice to the user that the collected data is sufficient. This can be for example a text message or a map of a respective floor colored completely in green. Alternatively, data for a map can be assembled that indicates all $EEP_{68}$ areas determined in action 516 for radio models with low quality and for radio models with high quality in green. In addition, data for this map can be assembled that shows all areas determined in action 517 to require further measurements in red and all other areas in green. Again, in case different colors are assigned to an area based on the results of actions 516 and 517, red may always be the color of choice in certain embodiments.

It is to be understood that various classification could be used just the same; it would also be possible to use a more differentiated classification than a binary classification. It is further to be understood that any other markings than red and green color could be used just the same.

Mobile device 300 may now present the data of the map to a user of mobile device 300 via display 308. (action 521) The presentation may include a map with the outlines of a floor, possibly including an indication of inner walls, open spaces—as in the case of stair cases or elevators—, etc. The grid areas of the overlaying grid—and/or circles, ellipses, circular areas or elliptical areas, as the case may be—may be transparently colored in green or red.

It is to be understood that further criteria may be considered by mobile device 300 or the user of mobile device 300 for determining whether certain areas have to be visited again for a collection of data. For instance, if the collector comes to the conclusion that positioning quality is poor due to reasons other than fingerprints density and coverage, for example due to a poor WLAN infrastructure, meaning that no data collection effort therein can improve the performance, a further visiting of such areas may be omitted.

The user may now collect further fingerprint data in the indicated areas, and the process may continue in an iterative process, until the general quality of the set of radio models determined in action 515 exceeds a predetermined threshold and/or until the improvement the general quality of the set of radio models determined in action 515 falls short of a predetermined threshold and/or until a predetermined number of iterations has been completed and/or until a user comes to the conclusion that no further improvement can be achieved. (action 519)

Once the additional collection has been completed, a completed set of fingerprints may be transmitted by mobile device 300 to server 310 via cellular communication network 330 and the Internet 320. Alternatively or in addition, the latest version of the data of the grid determined in action 512 or the data of latest version of the radio models determined in action 513 may be transmitted to server 310. Server 310 may then generate assistance data for a WLAN based positioning from the obtained data. Server 310 causes storage of the assistance data and provides the assistance data to mobile devices upon request. These mobile devices may then determine their position using the assistance data and radio measurements on WLAN access points at their current position.

Figure 5:
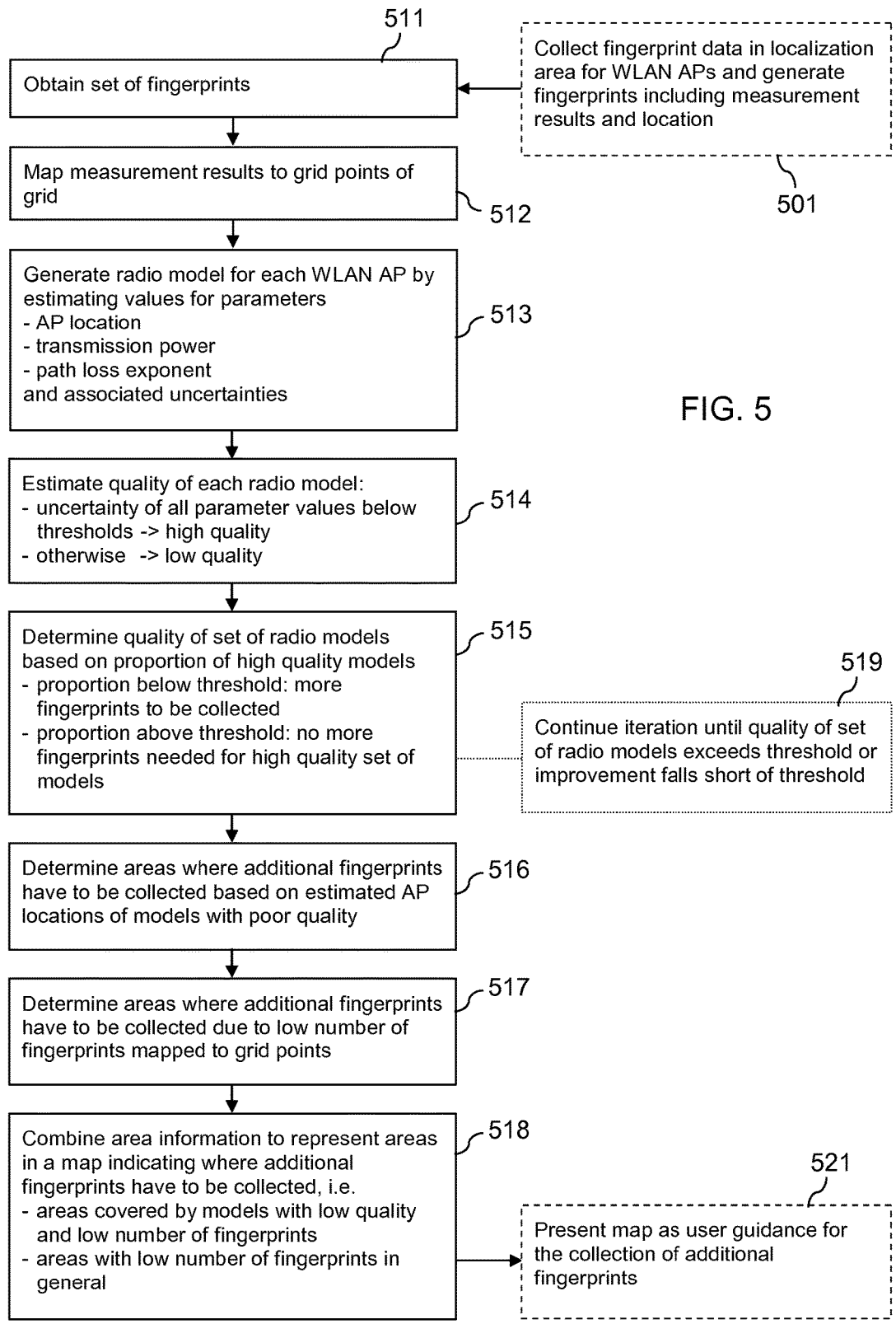
FIG. 5 is a flow chart illustrating an example embodiment of an operation in the system of FIG. 3 or 4.

In example operations in the system of FIG. 4, in contrast, processor 401 and some of the program code stored in memory 402 may cause server 400 to perform the actions 511 to 519 of FIG. 5 when the program code is retrieved from memory 402 and executed by processor 401. Actions 501 and 521 could be performed by mobile devices 411, 412 of FIG. 4, and any communication between mobile devices 411, 412 and server 400 may take place via cellular communication network 430 and the Internet 420.

Server 400 may obtain fingerprints from various mobile devices 411, 412.

Server 400 may treat the fingerprints from each mobile device 411, 412 separately. In this case, the result of the evaluation will be transmitted to a single mobile device 411, 412 for presentation to a user on a display of the mobile device 411, 412.

Alternatively, server 400 could process fingerprints from several mobile devices 411, 412 in common. This may be useful, for instance, if several users of mobile devices survey a single localization area in a joint effort. For example, several users may split the survey of a building among each other by floors and/or by wings or other parts of a building. In this case, the result of a classification for the localization area will be transmitted to the mobile device 411, 412 of each of the users for presentation on a display of the respective mobile device 411, 412.

To enable an efficient transmission of the data for the feedback from server 400 to mobile devices 411, 412, a matrix could be defined for each floor of each localization site, in which each matrix cell corresponds to one of the grid areas. A value representing the classification that has been determined in action 518 for a respective grid area (or for any other area or structure) may be associated with the corresponding matrix cell. The values may be for example of an enumeration type {'Poor', 'Good'} or {'Red', 'Green'} or {'0', '1'}, where the bit values may indicate whether or not an additional collection of fingerprints in the geographic location represented by the corresponding grid area is required. A mobile device 411, 412 receiving the matrix data may then transform the matrix into a presentation of a grid overlaying a map. The map data could be transmitted along with the matrix data, but it could already be available at mobile device 411, 412 for providing orientation to the user during the survey.

It is to be understood that the presented example systems as well as the presented example operations may be varied in many ways. The operations may be varied for instance by modifying actions, by omitting actions and/or by adding actions. In addition, the order of actions could be modified.

For example, once a set of fingerprints has been obtained for a localization site in action 511, it could be determined as well for how many different access points measurement results have been received. Alternatively, the number of access points installed at a particular localization site or the number of access points, for which a radio model has already been generated for the localization site, could be obtained from a database. In the following, it will be assumed for a fist alternative that a number of access points, for which a radio model has already been generated for the localization site, is considered. Then, it could be determined for each fingerprint separately, whether the fingerprint comprises measurement results for the majority of these access points. Based on the result, colors could be associated to an area of a map corresponding to the location indicated in the fingerprint. Such an area of the map could be for instance a tile corresponding to a geographical area of 2×2 meters in the localization site. The color could be based on a percentage of access points that are represented in a fingerprint. If a fingerprint contains measurement results for more than 90% of the access points, an associated area may be colored in green; if a fingerprint contains measurement results for more than 80% and up to 90% of the access points, an associated area may be colored in yellow; if a fingerprint contains measurement results for more than 70% and up to 80% of the access points, an associated area may be colored in red, etc. The colors can indicate areas in which more measurements should be collected. The map could be presented to a surveying person for example in addition to the map that is based on the data assembled in action 518; the surveying person may be enabled for example to switch between two views in order to be able to evaluate the quality of the data collected so far from different perspectives. It may be noted that this approach may require a creation of a synthetic grid, or some data base which can separate data for each access point, within the device taking care of the processing, so that it is possible to check for each access point if sufficient data is available.

Alternatively to obtaining information from a database on a number of access points, for which radio models have already been generated for the localization site, it would be possible to determine the number of access points for which a radio model could be created based on measurement results that have been received in fingerprints for the localization site. This number could be determined by checking at least one condition that is suited to indicate if a radio model can be created for access points for which measurement results have been received. Checking whether the creation of a radio model is possible could be performed prior to and independently of a creation of a radio model. Such a checking may be less computational extensive than creating radio models and it may be performed in the mobile device collecting the fingerprints. The at least one condition that may be checked to determine whether a radio model can be created for an access point may comprise for example a sufficient number of locations of fingerprints including measurement results for an access point and/or good dynamics of the RSS values for the access point in the received fingerprints. A threshold for a sufficient number of locations of fingerprints could be set for instance to at least five locations of grid points to which the measurement results for an access point in the received fingerprints have been mapped; that is, the access point has to have been heard in areas that are associated with at least five grid point locations. RSS values may be determined to show good dynamics, for instance, if the standard deviation and/or the mean of the RSS values for the access point in the received fingerprints is higher than or equal to a pre-define standard deviation (std) and/or a pre-define mean, for example 5 dB and/or −70 dB respectively. If the checking shows that an access point has been heard at least in a number of grid point locations exceeding the predetermined threshold and/or its RSS values show good dynamics, then it can be assumed that a radio model—or a model of desired quality—can be created for the access point. The predetermined values can be learned for example from a radio map data base of other buildings, or they can be a good guess. The dynamics of the RSS values can be matched with a prior value of mean and standard deviation and provide information if samples are good enough for the creation of access point radio models. The matching can be done by calculating a probability using some probability density function, for example a non-uniform normal distribution. The status of each access point—that is the determined information whether a radio model can be created or not for the access point—may be used for determining the number of access points for which a radio model could be created for a localization site. The knowledge on the number of access points for which a radio model could be created may be used in a similar way as described above for the number of access points for which a radio model has been created for deciding on a coloring of areas that are associated with fingerprints and thus for indicating to a surveying person in which areas further fingerprints should be collected.

It is to be understood that these variations are not only suited to be used as a supplement to the operations described with reference to FIG. 5; rather they could also be considered to constitute separate inventive solutions on their own.

In another example variation, possibly after a plurality of iterations of the process presented with reference to FIG. 5, data for a map could be assembled, in which colors or other markings indicate areas of a localization site where a further collection of fingerprints may not necessarily help to further improve the performance. For example, it might be helpful to a customer receiving information of areas with low access point density and/or areas with all weak signals, for example outdoor areas, etc. Areas where collection of more fingerprints may not help may be detected by matching a RSS distribution of a fingerprint with predefine RSS distribution values. An RSS distribution of a fingerprint can be created by considering RSS values of all access points for which measurement results are available in a fingerprint. This matching can also be done by calculating probabilities using an appropriate probability density function, for instance a non-uniform normal distribution.

For example, in an alternative embodiment, the fingerprints could include results on measurements on signals of other non-cellular terrestrial communication nodes instead of or in addition to WLAN access point signals.

Summarized, certain embodiments of the invention may have the effect that data collectors do not need to waste resources, namely their time, on the collection of fingerprints that do not contribute to the performance of the systems. This allows optimizing resources for data collection. Certain embodiments of the invention may have the effect that a person collecting data is guided to areas where additional data collection is needed, and that it is indicated when collected data is sufficient for generating radio models of high quality. This may make the process of data collection more efficient and comfortable to the data collectors. The generated radio models—or radio models newly generated based on the last available set of fingerprints for a localization site—could eventually be used as well for wireless network analysis and network planning applications, possibly in conjunction with a respective quality of the radio models determined in the last or only iteration.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 6:
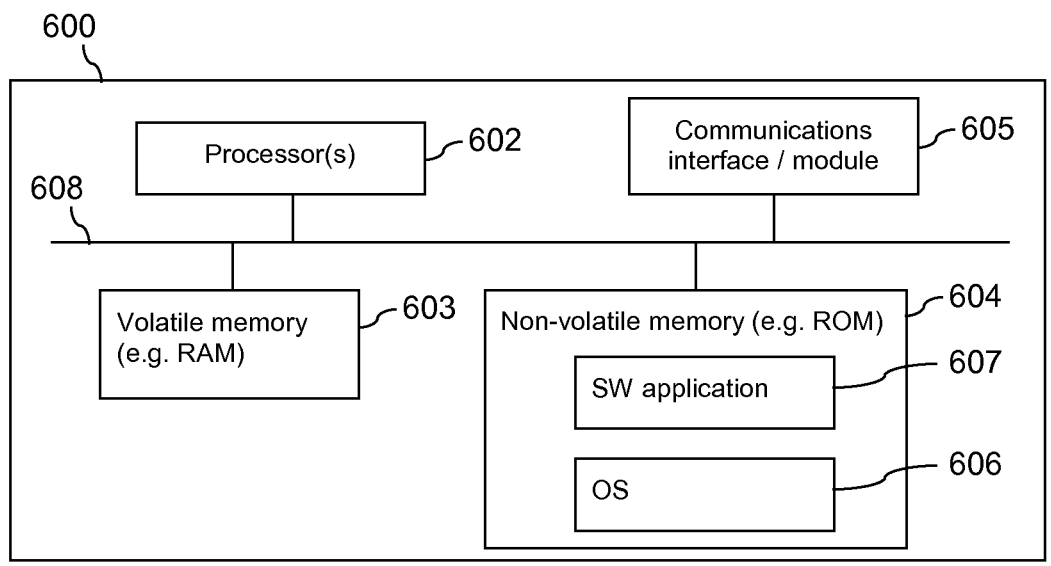
FIG. 6 is a schematic block diagram of an example embodiment of an apparatus.
Figure 7:
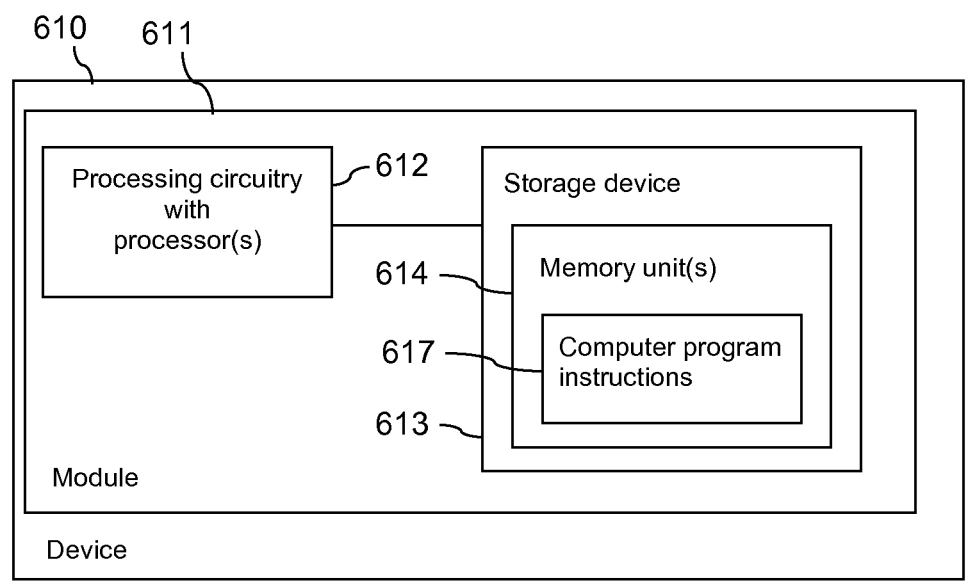
FIG. 7 is a schematic block diagram of an example embodiment of an apparatus.

Example embodiments using at least one processor and at least one memory as a non-transitory data medium are shown in FIGS. 6 and 7.

FIG. 6 is a schematic block diagram of a device 600. Device 600 includes a processor 602. Processor 602 is connected to a volatile memory 603, such as a RAM, by a bus 608. Bus 608 also connects processor 602 and RAM 603 to a non-volatile memory 604, such as a ROM. A communications interface or module 605 is coupled to bus 608, and thus also to processor 602 and memories 603, 604. Within ROM 604 is stored a software (SW) application 607. Software application 607 may be a positioning application, although it may take some other form as well. An operating system (OS) 606 also is stored in ROM 604.

FIG. 7 is a schematic block diagram of a device 610. Device 610 may take any suitable form. Generally speaking, device 610 may comprise processing circuitry 612, including one or more processors, and a storage device 613 comprising a single memory unit or a plurality of memory units 614. Storage device 613 may store computer program instructions 617 that, when loaded into processing circuitry 612, control the operation of device 610. Generally speaking, also a module 611 of device 610 may comprise processing circuitry 612, including one or more processors, and storage device 613 comprising a single memory unit or a plurality of memory units 614. Storage device 613 may store computer program instructions 617 that, when loaded into processing circuitry 612, control the operation of module 611.

The software application 607 of FIG. 6 and the computer program instructions 617 of FIG. 7, respectively, may correspond e.g. to the computer program code in any of memories 102, 302 or 402, respectively.

Figure 8:
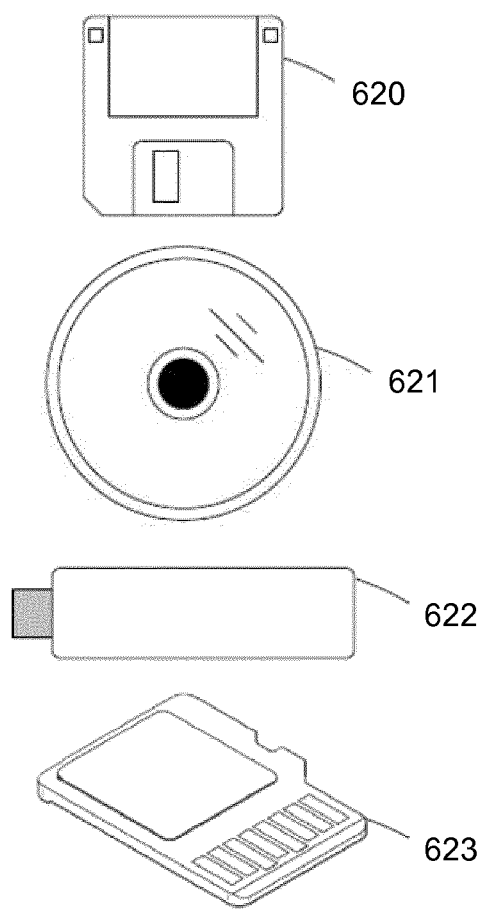
FIG. 8 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 8, which presents, from top to bottom, schematic diagrams of a magnetic disc storage 620, of an optical disc storage 621, of a semiconductor memory circuit device storage 622 and of a Micro-SD semiconductor memory card storage 623.

The functions illustrated by processor 101 in combination with memory 102, or processor 301 in combination with memory 302, or component 304, or processor 401 in combination with memory 402, or component 404 can also be viewed as means for obtaining fingerprints that have been collected by at least one mobile device for supporting a positioning of other mobile devices, each fingerprint comprising results of measurements on radio signals of at least one communication node at a particular location and an indication of the particular location; means for estimating values of parameters defining a radio model for the at least one communication node based on the obtained fingerprints; means for determining a quality of the radio model; and means for generating data for a feedback for a user of the at least one mobile device based on the determined quality of the radio model.

The program codes in memories 102, 302 and 402 can also be viewed as comprising such means in the form of functional modules.

FIGS. 2 and 5 may also be understood to represent example functional blocks of computer program codes supporting positioning quality assurance.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
    obtaining fingerprints that have been collected by at least one mobile device for supporting a positioning of other mobile devices, each fingerprint comprising results of measurements on radio signals of at least one communication node at a particular location and an indication of the particular location;
    estimating values of parameters defining a radio model for the at least one communication node based on the obtained fingerprints;
    determining a quality of the radio model; and
    generating data for a feedback for a user of the at least one mobile device based on the determined quality of the radio model.

2. A method according to claim 1, wherein determining a quality of the radio model comprises:
    determining an uncertainty of the estimated value of at least one of the parameters; and
    determining a quality of the radio model based on the determined uncertainty of the value of the at least one parameter.

3. The method according to claim 2, wherein determining an uncertainty of a value of at least one parameter comprises determining an uncertainty of values of a plurality of the parameters, and wherein the quality of the radio model is determined to be high, if the uncertainty of each of the values of the plurality of the parameters lies below a predetermined threshold for the respective parameter.

4. A method according to claim 1, wherein the parameters comprise at least one of:
    a location of the communication node; and/or
    a transmission power used by the communication node;
    a received signal strength at a predetermined reference distance to the communication node; and/or
    a path loss exponent for signals transmitted by the communication node; and/or
    an average path loss of signals transmitted by the communication node.

5. The method according to claim 1, further comprising determining a quality of a set of a plurality of radio models for a particular site for which values of parameters have been estimated, the quality of the set corresponding to a proportion of radio models for the particular site with high quality to a total number of communication nodes for which results of measurements are included in the obtained fingerprints for the particular site.

6. The method according to claim 5, further comprising generating an indication that no further fingerprints have to be collected in case the determined quality of the set of radio models exceeds a predetermined threshold.

7. The method according to claim 1, wherein generating data for a feedback for a user of the at least one mobile device based on the determined quality of the radio model comprises:
   generating an indication of the quality of the radio model for presentation to the user;
   generating an indication of the quality of the radio model and an indication of an estimated location of an associated communication node for presentation to the user;
   generating an indication of the quality of the radio model and an indication of an area covered by the radio model for presentation to the user;
   generating an indication of an area covered by the radio model, in which area further fingerprints should be collected, for presentation to the user, in case the quality of the radio model has been determined to be low according to at least one predetermined criterion;
   generating an indication of an area covered by the radio model, in which area further fingerprints should be collected, for presentation to the user, in case the quality of the radio model has been determined to be low according to at least one predetermined criterion and in case a number of fingerprints collected in the area falling short of a predetermined number of fingerprints has been obtained;
   generating an indication of areas for which areas a number of fingerprints below a predetermined number of fingerprints has been collected for presentation to the user;
   generating an indication of areas in which additional fingerprints should be collected for presentation to the user;
   generating an indication of a quality of a set of radio models for a plurality of communication nodes for which values of parameters have been estimated for presentation to the user; and
   generating an indication of a quality of a set of radio models for a plurality of communication nodes, for which values of parameters have been estimated, for presentation to the user, the quality of the set of radio models being based on a determined quality of each of the radio models.

8. The method according to claim 1, wherein the actions are performed in an iterative process, and wherein the apparatus estimates values of parameters of a radio model for the at least one communication node based on a growing number of obtained fingerprints until a predetermined criterion is met.

9. The method according to claim 1, further comprising presenting, based on the generated data for the feedback, a map of a site at which fingerprints are being collected on a display of the mobile device, the map including a marking of each area in which further fingerprints should be collected.

10. The method according to claim 1, wherein the at least one communication node comprises at least one of:
   at least one terrestrial non-cellular transmitter; and/or
   at least one access point of at least one wireless local area network; and/or
   at least one Bluetooth transmitter; and/or
   at least one Bluetooth low energy transmitter; and/or
   wherein the at least one apparatus is or belongs to one of:
   the at least one mobile device; and
   a server that is configured to obtain and process sets of fingerprints from a plurality of mobile devices.

11. An apparatus comprising at least one processor and at least one memory including computer program code, the at least one memory and the computer program code configured to, with the at least one processor, cause the apparatus at least to perform:
   obtain fingerprints that have been collected by at least one mobile device for supporting a positioning of other mobile devices, each fingerprint comprising results of measurements on radio signals of at least one communication node at a particular location and an indication of the particular location;
   estimate values of parameters defining a radio model for the at least one communication node based on the obtained fingerprints;
   determine a quality of the radio model; and
   generate data for a feedback for a user of the at least one mobile device based on the determined quality of the radio model.

12. The apparatus according to claim 11, wherein determining a quality of the radio model comprises:
   determining an uncertainty of the estimated value of at least one of the parameters; and
   determining a quality of the radio model based on the determined uncertainty of the value of the at least one parameter.

13. The apparatus according to claim 12, wherein determining an uncertainty of a value of at least one parameter comprises determining an uncertainty of values of a plurality of the parameters, and wherein the quality of the radio model is determined to be high, if the uncertainty of each of the values of the plurality of the parameters lies below a predetermined threshold for the respective parameter.

14. The apparatus according to claim 11, wherein the parameters comprise at least one of:
   a location of the communication node; and/or
   a transmission power used by the communication node; and/or
   a received signal strength at a predetermined reference distance to the communication node; and/or
   a path loss exponent for signals transmitted by the communication node; and/or
   an average path loss of signals transmitted by the communication node.

15. The apparatus according to claim 11, wherein the at least one memory and the computer program code are configured to, with the at least one processor, cause the apparatus to determine a quality of a set of a plurality of radio models for a particular site for which values of parameters have been estimated, the quality of the set corresponding to a proportion of radio models for the particular site with high quality to a total number of communication nodes for which results of measurements are included in the obtained fingerprints for the particular site.

16. The apparatus according to claim 15, wherein the at least one memory and the computer program code are configured to, with the at least one processor, cause the apparatus to generate an indication that no further fingerprints have to be collected in case the determined quality of the set of radio models exceeds a predetermined threshold.

17. The apparatus according to claim 11, wherein generating data for a feedback for a user of the at least one mobile device based on the determined quality of the radio model comprises:
   generating an indication of the quality of the radio model for presentation to the user;

generating an indication of the quality of the radio model and an indication of an estimated location of an associated communication node for presentation to the user;

generating an indication of the quality of the radio model and an indication of an area covered by the radio model for presentation to the user;

generating an indication of an area covered by the radio model, in which area further fingerprints should be collected, for presentation to the user, in case the quality of the radio model has been determined to be low according to at least one predetermined criterion;

generating an indication of an area covered by the radio model, in which area further fingerprints should be collected, for presentation to the user, in case the quality of the radio model has been determined to be low according to at least one predetermined criterion and in case a number of fingerprints collected in the area falling short of a predetermined number of fingerprints has been obtained;

generating an indication of areas for which a number of fingerprints below a predetermined number of fingerprints has been collected for presentation to the user;

generating an indication of areas in which additional fingerprints should be collected for presentation to the user;

generating an indication of a quality of a set of radio models for a plurality of communication nodes for which values of parameters have been estimated for presentation to the user; and generating an indication of a quality of a set of radio models for a plurality of communication nodes, for which values of parameters have been estimated, for presentation to the user, the quality of the set of radio models being based on a determined quality of each of the radio models.

18. The apparatus according to claim 11, wherein the at least one memory and the computer program code are configured to, with the at least one processor, cause the apparatus to perform the actions in an iterative process, and to estimate values of parameters of a radio model for the at least one communication node based on a growing number of obtained fingerprints until a predetermined criterion is met.

19. The apparatus according to claim 11, wherein the at least one memory and the computer program code are configured to, with the at least one processor, cause the apparatus to present, based on the generated data for the feedback, a map of a site at which fingerprints are being collected on a display of the mobile device, the map including a marking of each area in which further fingerprints should be collected.

20. The apparatus according to claim 11, wherein the at least one communication node comprises at least one of:
at least one terrestrial non-cellular transmitter; and/or
at least one access point of at least one wireless local area network; and/or
at least one Bluetooth transmitter; and/or
at least one Bluetooth low energy transmitter.

21. The apparatus according to claim 11, wherein the apparatus is one of:
a chip;
a module for a server;
a server;
a module for a mobile device; and
a mobile device.

22. A computer readable storage medium in which computer program code is stored, the computer program code causing an apparatus to perform the following when executed by a processor:
obtain fingerprints that have been collected by at least one mobile device for supporting a positioning of other mobile devices, each fingerprint comprising results of measurements on radio signals of at least one communication node at a particular location and an indication of the particular location;
estimate values of parameters defining a radio model for the at least one communication node based on the obtained fingerprints;
determine a quality of the generated radio model; and
generate data for a feedback for a user of the at least one mobile device based on the determined quality of the radio model.

* * * * *